United States Patent
Chen

(10) Patent No.: US 8,235,541 B2
(45) Date of Patent: Aug. 7, 2012

(54) BACKLIGHT MODULE AND DISPLAY DEVICE

(75) Inventor: Chien-Chou Chen, Taipei County (TW)

(73) Assignee: AmTRAN Technology Co., Ltd., New Taipei (TW)

( * ) Notice: Subject to any disclaimer, the term of this patent is extended or adjusted under 35 U.S.C. 154(b) by 361 days.

(21) Appl. No.: 12/616,135

(22) Filed: Nov. 10, 2009

(65) Prior Publication Data

US 2011/0044027 A1 Feb. 24, 2011

(30) Foreign Application Priority Data

Aug. 19, 2009 (TW) .............................. 98127890 A

(51) Int. Cl.
G09F 13/04 (2006.01)
F21S 4/00 (2006.01)
(52) U.S. Cl. .................. 362/97.3; 362/249.02; 362/609; 349/61; 349/62; 349/67
(58) Field of Classification Search ................. 362/97.3, 362/249.02, 609; 349/61–62, 67
See application file for complete search history.

(56) References Cited

U.S. PATENT DOCUMENTS

2007/0047257 A1 3/2007 Yamamoto
2008/0170178 A1* 7/2008 Kubota et al. .................. 349/65

FOREIGN PATENT DOCUMENTS

| CN | 1570715 | 1/2005 |
|---|---|---|
| CN | 1811552 | 8/2006 |
| CN | 101477274 | 7/2009 |
| WO | 2009072319 | 6/2009 |

OTHER PUBLICATIONS

"First Office Action of China Counterpart Application", issued on Aug. 25, 2011, p1-p6, in which the listed references were cited.

* cited by examiner

*Primary Examiner* — Diane Lee
*Assistant Examiner* — Sean Gramling
(74) *Attorney, Agent, or Firm* — Jianq Chyun IP Office

(57) ABSTRACT

A backlight module including a circuit board, at least one first light emitting diode (LED) device, at least one second LED device, and a reflection device is provided. The first and second LED devices are disposed on a carrying surface of the circuit board and electrically connected to the circuit board. The brightness of the first LED device is greater than that of the second LED device. The reflection device is disposed on the circuit board and exposes the first and second LED devices. The reflection device has at least one first reflection region disposed around the first LED device and at least one second reflection region disposed around the second LED device. The reflection ratio of the first reflection region opposite to the light-emitting energy of the first LED device is smaller than that of the second reflection region opposite to the light-emitting energy of the second LED device.

8 Claims, 6 Drawing Sheets

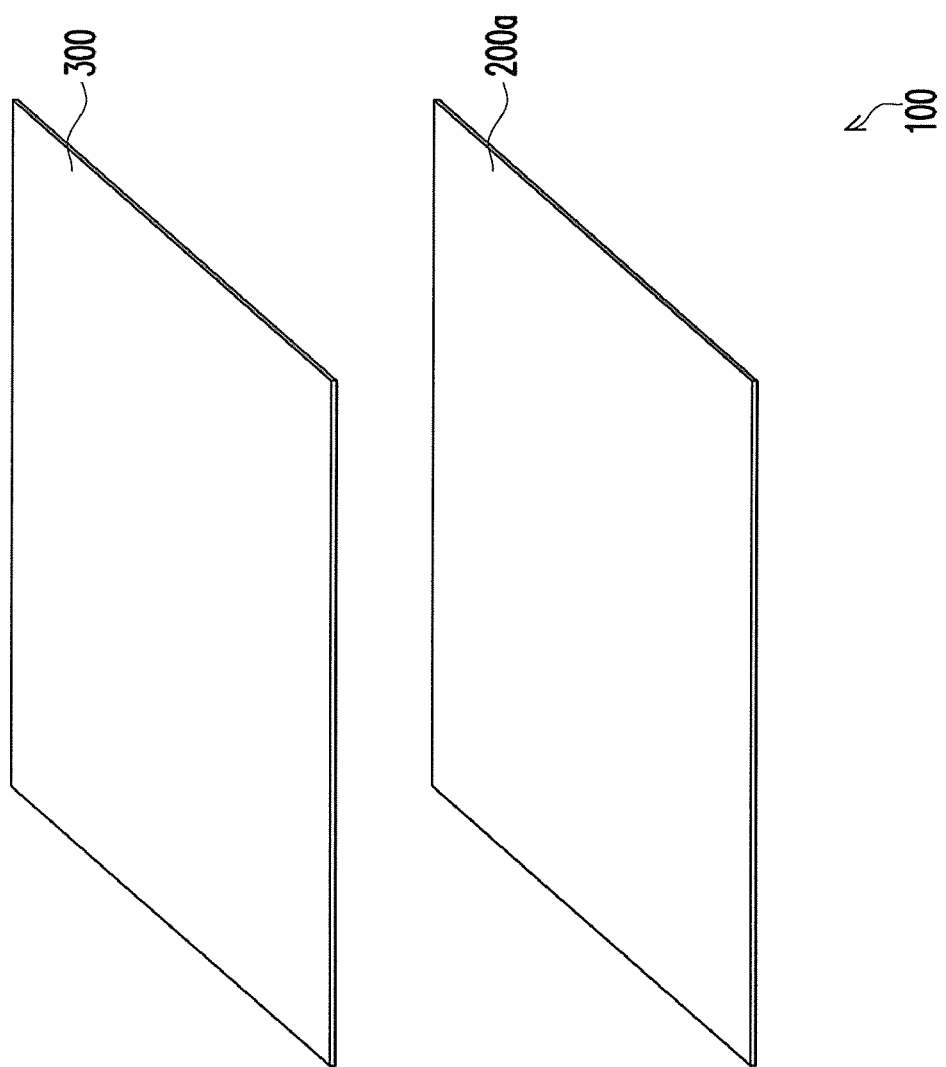

BACKLIGHT MODULE AND DISPLAY DEVICE

CROSS-REFERENCE TO RELATED APPLICATION

This application claims the priority benefit of Taiwan application serial no. 98127890, filed Aug. 19, 2009. The entirety of the above-mentioned patent application is hereby incorporated by reference herein and made a part of specification.

BACKGROUND OF THE INVENTION

1. Field of the Invention

The present invention generally relates to a light source module and a display device, and more particularly, to a backlight module and a display device using the same.

2. Description of Related Art

Along with the development of electronic technology, flat panel display has gradually replaced the conventional cathode ray tube (CRT) display as the mainstream display. Among all the existing flat panel displays, liquid crystal display (LCD) has the most mature technique and is most broadly used. Because the panel of a LCD does not emit light itself, a backlight module has to be provided as a display light source of the panel.

Among all the light sources that can be adopted in a backlight module, the light emitting diode (LED) is one of the most adaptable one for it offers high brightness, low power consumption, long lifespan, and minor heat generation, etc. Taking the light source of a direct type backlight module composed of LEDs as an example, the LEDs are welded on a circuit board as an array through the surface mount technology (SMT), and the circuit board is disposed on a frame of the backlight module.

Each LED has different brightness even supplied with the same current. Thus, in order to increase the luminous uniformity of the backlight module, the LEDs are usually ranked based on their brightness before they are welded onto the circuit board, and those too dark or too bright LEDs are eliminated. However, the cost of the backlight module may be increased by purchasing a large number of LEDs having similar brightness. Thereby, how to apply LEDs having different brightness into the same backlight module has become an important subject in the industry.

SUMMARY OF THE INVENTION

Accordingly, the present invention is directed to a backlight module with uniform luminance.

The present invention is also directed to a display device with good display quality.

The present invention provides a backlight module including a circuit board, at least one first light emitting diode (LED) device, at least one second LED device, and a reflection device. The circuit board has a carrying surface. The first LED device is disposed on the carrying surface of the circuit board and electrically connected to the circuit board. The second LED device is disposed on the carrying surface of the circuit board and electrically connected to the circuit board. The brightness of the first LED device is greater than that of the second LED device. The reflection device is disposed on the circuit board and exposes the first LED device and the second LED device. The reflection device has at least one first reflection region and at least one second reflection region, wherein the first reflection region is disposed around the first LED device, the second reflection region is disposed around the second LED device, and the reflection ratio of the first reflection region opposite to a light-emitting energy of the first LED device is smaller than that of the second reflection region opposite to a light-emitting energy of the second LED device.

According to an embodiment of the present invention, the circuit board has at least one first carrying region and at least one second carrying region. The first LED device is located on the first carrying region, and the first reflection region of the reflection device is disposed corresponding to the first carrying region. The second LED device is located on the second carrying region, and the second reflection region of the reflection device is disposed corresponding to the second carrying region.

According to an embodiment of the present invention, the reflection device is a reflective sheet. The reflective sheet has at least one first opening and at least one second opening. The first opening exposes the first LED device, the second opening exposes the second LED device, and the surface area of the first opening is greater than that of the second opening.

According to an embodiment of the present invention, the first opening is in a rectangular shape or a circular shape.

According to an embodiment of the present invention, the second opening is in a rectangular shape or a circular shape.

According to an embodiment of the present invention, the first reflection region of the reflection device is formed by coating a first reflective material layer, the second reflection region of the reflection device is formed by coating a second reflective material layer, and the reflectivity of the first reflective material layer is smaller than that of the second reflective material layer.

According to an embodiment of the present invention, the backlight module further includes an optical film set disposed above the circuit board.

According to an embodiment of the present invention, the optical film set includes a prism sheet, a diffuser, a collector, a brightness enhancement film, a protecting sheet, or a combination thereof.

The present invention also provides a display device including a display panel and a backlight module. The backlight module is disposed at one side of the display panel and which includes a circuit board, at least one first LED device, at least one second LED device, and a reflection device. The circuit board has a carrying surface. The first LED device is disposed on the carrying surface of the circuit board and electrically connected to the circuit board. The second LED device is disposed on the carrying surface of the circuit board and electrically connected to the circuit board. The brightness of the first LED device is greater than that of the second LED device. The reflection device is disposed on the circuit board and exposes the first LED device and the second LED device. The reflection device has at least one first reflection region and at least one second reflection region, wherein the first reflection region is disposed around the first LED device, the second reflection region is disposed around the second LED device, and the reflection ratio of the first reflection region opposite to a light-emitting energy of the first LED device is smaller than that of the second reflection region opposite to a light-emitting energy of the second LED device.

According to an embodiment of the present invention, the circuit board has at least one first carrying region and at least one second carrying region. The first LED device is located on the first carrying region, and the first reflection region of the reflection device is disposed corresponding to the first carrying region. The second LED device is located on the second carrying region, and the second reflection region of the reflection device is disposed corresponding to the second carrying region.

According to an embodiment of the present invention, the reflection device is a reflective sheet. The reflective sheet has at least one first opening and at least one second opening. The first opening exposes the first LED device, the second opening exposes the second LED device, and the surface area of the first opening is greater than that of the second opening.

According to an embodiment of the present invention, the first opening is in a rectangular shape or a circular shape.

According to an embodiment of the present invention, the second opening is in a rectangular shape or a circular shape.

According to an embodiment of the present invention, the first reflection region of the reflection device is formed by coating a first reflective material layer, the second reflection region of the reflection device is formed by coating a second reflective material layer, and the reflectivity of the first reflective material layer is smaller than that of the second reflective material layer.

According to an embodiment of the present invention, the backlight module further includes an optical film set disposed above the circuit board.

According to an embodiment of the present invention, the optical film set includes a prism sheet, a diffuser, a collector, a brightness enhancement film, a protecting sheet, or a combination thereof.

As described above, according to the present invention, the brightness of the first LED device is greater than that of the second LED device. Thus, the reflection ratio of the first reflection region in the reflection device opposite to the light-emitting energy of the first LED device is smaller than that of the second reflection region opposite to the light-emitting energy of the second LED device. As a result, the brighter first LED device receives less reflected light intensity while the darker second LED device receives more reflected light intensity, so that the brightness difference between the first LED device and the second LED device is reduced, the luminance uniformity of the backlight module is improved, and the display quality of a display device using the backlight module is also improved.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 is a diagram of a display device according to an embodiment of the present invention.

DESCRIPTION OF THE EMBODIMENTS

Figure 2A:
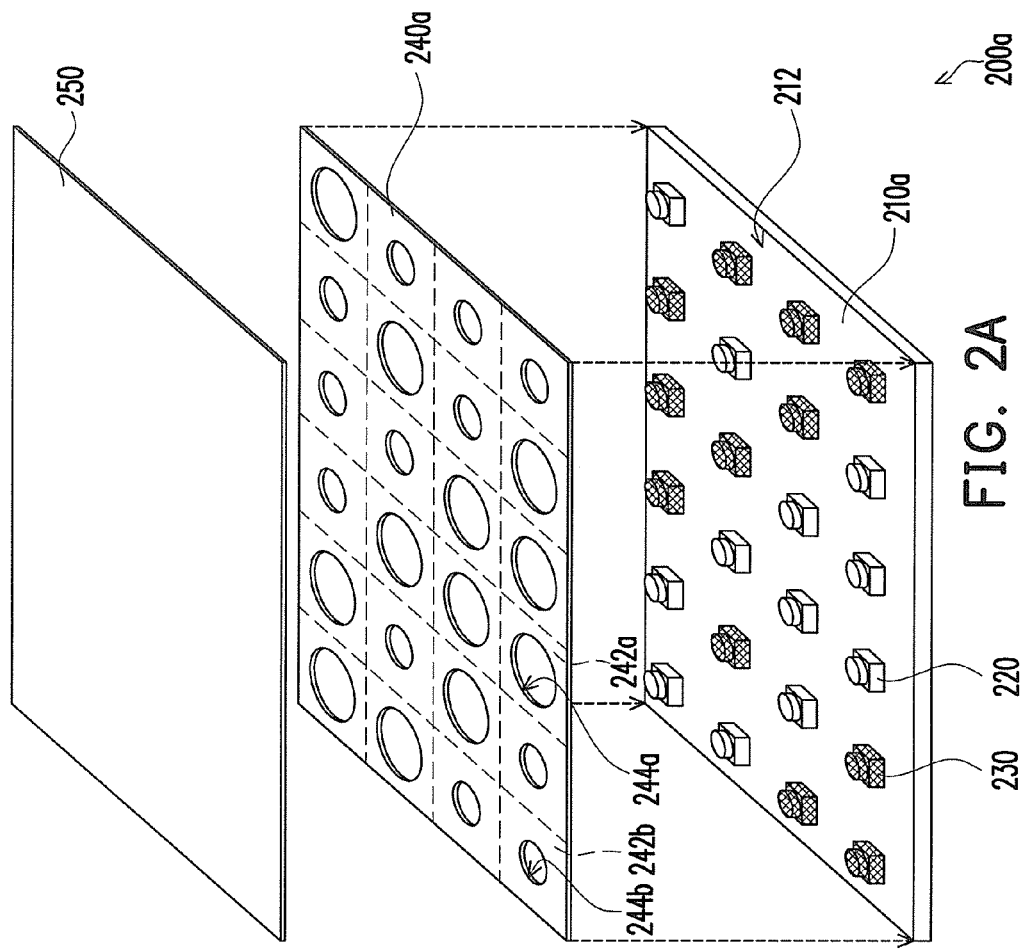
FIG. 2A is an explosion diagram of a backlight module in FIG. 1.

Reference will now be made in detail to the present preferred embodiments of the invention, examples of which are illustrated in the accompanying drawings. Wherever possible, the same reference numbers are used in the drawings and the description to refer to the same or like parts.

Figure 2B:
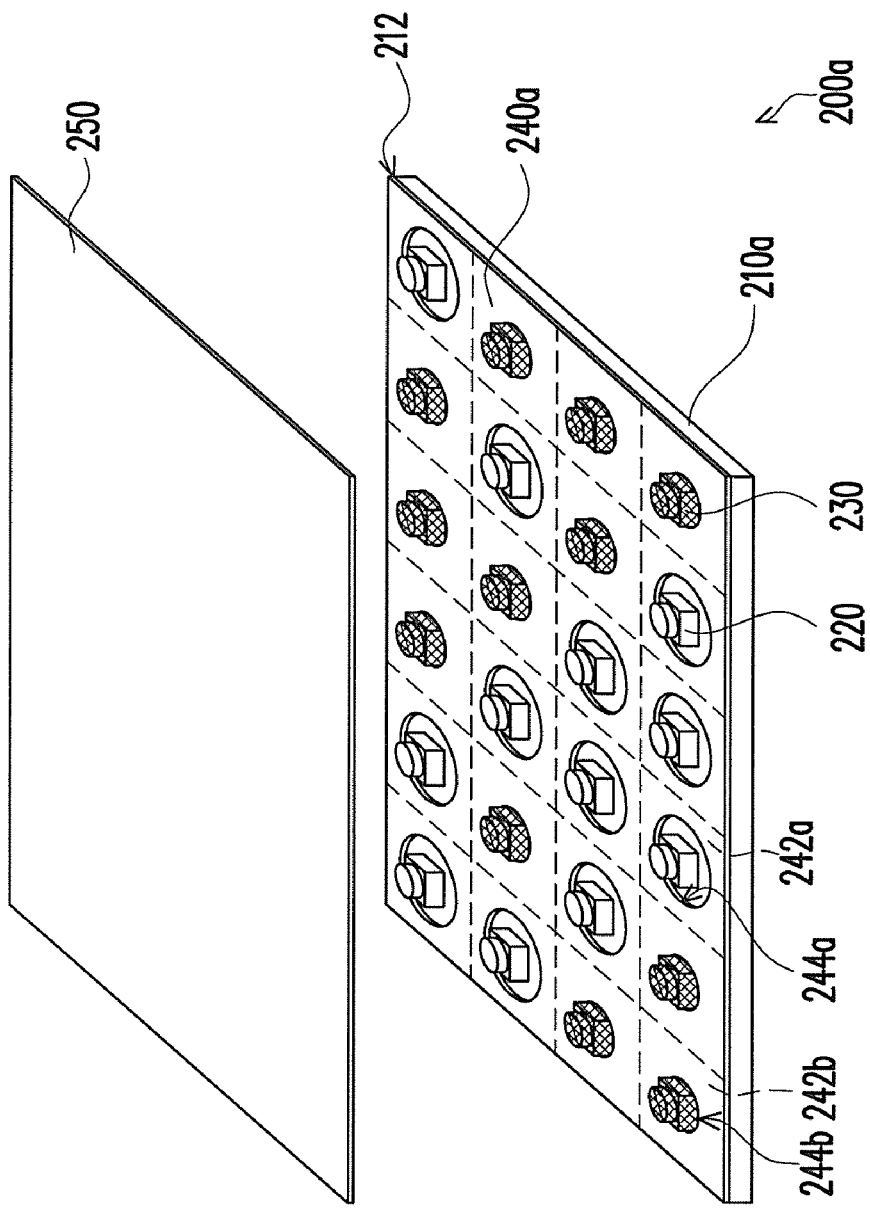
FIG. 2B is a comprehensive diagram of the backlight module in FIG. 2A.

FIG. 1 is a diagram of a display device according to an embodiment of the present invention, FIG. 2A is an explosion diagram of a backlight module in FIG. 1, and FIG. 2B is a comprehensive diagram of the backlight module in FIG. 2A. Referring to both FIG. 1 and FIG. 2A, in the present embodiment, the display device 100 includes a backlight module 200a and a display panel 300, wherein the backlight module 200a is disposed at one side of the display panel 300 (for example, below the display panel 300) for providing a display light source to the display panel 300. The display device 100 may be a liquid crystal display (LCD) device.

In the present embodiment, the backlight module 200a includes a circuit board 210a, at least one (multiple are illustrated in FIG. 2A) first light emitting diode (LED) device 220, at least one (multiple are illustrated in FIG. 2A) second LED device 230, and a reflection device 240a, wherein the backlight module 200a may be a direct type backlight module. To be specific, the circuit board 210a has a carrying surface 212. The first LED device 220 is disposed on the carrying surface 212 of the circuit board 210a and electrically connected to the circuit board 210a for providing a light. The second LED device 230 is also disposed on the carrying surface 212 of the circuit board 210a and electrically connected to the circuit board 210a for providing a light. Particularly, in the present embodiment, the brightness of the first LED device 220 is greater than that of the second LED device 230.

Referring to both FIG. 2A and FIG. 2B, the reflection device 240a is disposed on the circuit board 210a and exposes the first LED device 220 and the second LED device 230, wherein the reflection device 240a may be a reflective sheet. To be specific, the reflection device 240a has at least one first reflection region 242a, at least one second reflection region 242b, at least one first opening 244a, and at least one second opening 244b. The first opening 244a exposes the first LED device 220, and the first reflection region 242a is disposed around the first LED device 220. Namely, the first reflection region 242a surrounds the first opening 244a for reflecting a light beam emitted by the first LED device 220, so as to improve the luminous efficiency of the first LED device 220. The second opening 244b exposes the second LED device 230, and the second reflection region 242b is disposed around the second LED device 230. Namely, the second reflection region 242b surrounds the second opening 244b for reflecting a light beam emitted by the second LED device 230, so as to improve the luminous efficiency of the second LED device 230. In the present embodiment, the surface area of the first opening 244a is greater than that of the second opening 244b, and the first opening 244a and the second opening 244b respectively have a circular shape. However, in other embodiments, the first opening 244a and the second opening 244b may also be respectively in a rectangular shape or other polygonal shapes, or the first opening 244a and the second opening 244b may also be in different shapes. In other words, the shapes of the first opening 244a and the second opening 244b illustrated in FIGS. 2A and 2B are only an example but not intended for limiting the present invention.

To be specific, in the present embodiment, because the surface area of the first opening 244a of the reflection device 240a is greater than that of the second opening 244b, when the first LED device 220 and the second LED device 230 emit lights, the reflection ratio of the first reflection region 242a opposite to the light-emitting energy of the first LED device 220 is smaller than that of the second reflection region 242b opposite to the light-emitting energy of the second LED device 230. Namely, the brighter first LED device 220 receives less reflected light intensity, and the darker second LED device 230 receives more reflected light intensity. It should be noted that the reflection ratio is defined as the quotient by dividing the light energy reflected by the reflection region (for example, the first reflection region 242a or the second reflection region 242b) by the light-emitting energy of the LED device (for example, the first LED device 220 or the second LED device 230).

Since in the present embodiment, the brightness of the first LED device 220 is greater than that of the second LED device 230 and the surface area of the first opening 244a of the reflection device 240a is greater than that of the second opening 244b, when the first reflection region 242a and the second reflection region 242b of the reflection device 240a respectively reflect the lights from the first LED device 220 and the second LED device 230, the brightness difference between the first LED device 220 and the second LED device 230 is reduced and the luminance uniformity of the backlight module 200a is improved. In other words, in the present embodiment, openings (for example, the first opening 244a and the second opening 244b) having different surface areas are disposed in the reflection device 240a corresponding to LED devices (for example, the first LED device 220 and the second LED device 230) of different brightness. Namely, the opening (for example, the first opening 244a) having the larger surface area is disposed corresponding the LED device (for example, the first LED device 220) having the greater brightness, and the opening (for example, the second opening 244b) having the smaller surface area is disposed corresponding to the LED device (for example, the second LED device 230) having the smaller brightness, so that the brightness difference between the LED devices (for example, the first LED device 220 and the second LED device 230) is reduced, and the luminance uniformity of the backlight module 200a is improved. Moreover, the display quality of a display device 100 using the backlight module 200a is also improved.

Additionally, in the present embodiment, the backlight module 200a further includes an optical film set 250 disposed above the circuit board 210a (for example, about 30 mm above the circuit board 210a). The optical film set 250 helps to uniform the light beams emitted by the first LED device 220 and the second LED device 230. Generally speaking, the optical film set 250 includes a prism sheet, a diffuser, a collector, a brightness enhancement film, a protecting sheet, or a combination of foregoing elements for further optimize the light emitting effect. The type and number of optical films in the optical film set 250 are not limited in the present invention and can be determined according to the actual requirement.

In short, because in the present embodiment, the brightness of the first LED device 220 is greater than that of the second LED device 230, the first opening 244a and the second opening 244b having different surface areas are disposed in the reflection device 240a respectively corresponding to the first LED device 220 and the second LED device 230 having different brightness to allow the brighter first LED device 220 to receive less reflected light intensity while the darker second LED device 230 receive more reflected light intensity, so that the luminance uniformity of the backlight module 200a can be improved. Besides, the optical film set 250 is further disposed for uniform the light beams emitted by the first LED device 220 and the second LED device 230, so as to further optimize the light emitting effect. Thus, the backlight module 200a in the present embodiment has uniform luminance, and the display quality of the display device 100 using the backlight module 200a is improved.

It should be mentioned that the numbers of the first LED device 220 and the second LED device 230 are not limited in the present invention. Even though multiple first LED devices 220 (for example, twelve) and second LED devices 230 (for example, twelve) are illustrated in FIGS. 2A and 2B and the first LED devices 220 and the second LED devices 230 have the same number, in other embodiments, the numbers of the first LED device 220 and the second LED device 230 can be increased or decreased according to the actual requirement. In addition, in other embodiments, other LED devices of different brightness may also be disposed as long as these LED devices are disposed corresponding to openings of different surface areas. Namely, a LED device of higher brightness is disposed corresponding to an opening of a larger surface area and a LED device of lower brightness is disposed corresponding to an opening of a smaller surface area, so as to improve the luminance uniformity of the backlight module. The numbers of the first LED device 220 and the second LED device 230 illustrated in FIGS. 2A and 2B are only examples but not intended for limiting the present invention.

Figure 3:
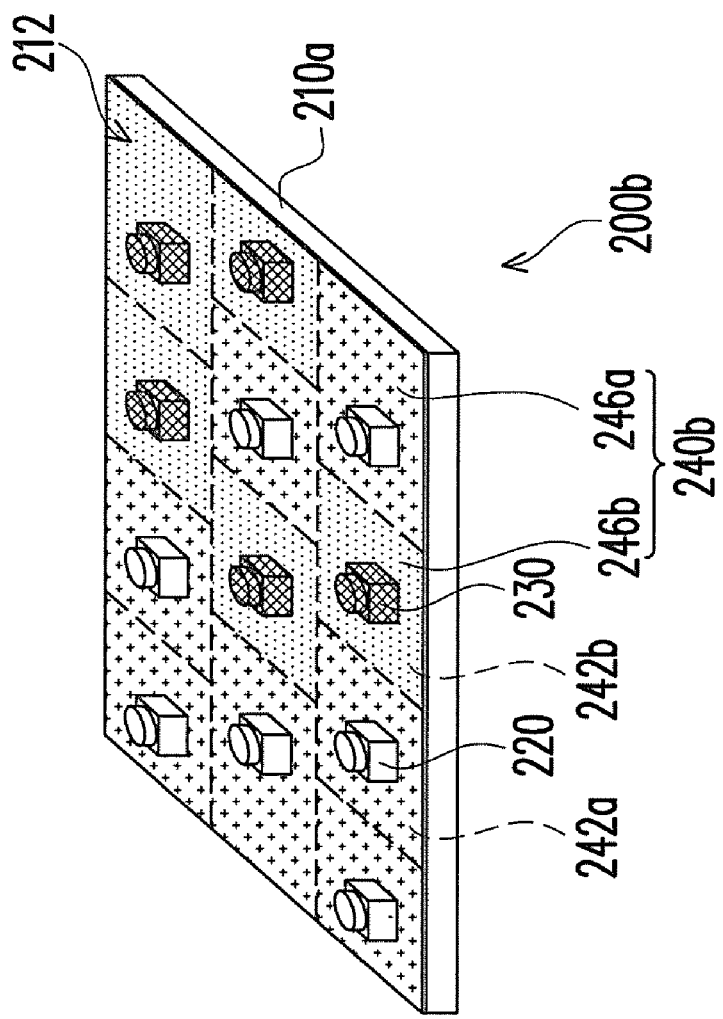
FIG. 3 is a diagram of a backlight module according to another embodiment of the present invention.

FIG. 3 is a diagram of a backlight module according to another embodiment of the present invention. Referring to both FIG. 2B and FIG. 3, the backlight module 200b in the present embodiment illustrated in FIG. 3 is similar to the backlight module 200a illustrated in FIG. 2B, and the major difference between the two is that in the backlight module 200b illustrated in FIG. 3, the first reflection region 242a of the reflection device 240b is formed by coating a first reflective material layer 246a, the second reflection region 242b of the reflection device 240b is formed by coating a second reflective material layer 246b, and the reflectivity of the first reflective material layer 246a is smaller than the reflectivity of the second reflective material layer 246b. In other words, the second reflective material layer 246b has a better reflection effect than the first reflective material layer 246a.

To be specific, in the present embodiment, because the first reflection region 242a is disposed around the first LED device 220, the second reflection region 242b is disposed around the second LED device 230, and the reflectivity of the first reflective material layer 246a is smaller than the reflectivity of the second reflective material layer 246b, when the first LED device 220 and the second LED device 230 emit lights, the reflection ratio of the first reflection region 242a opposite to the light-emitting energy of the first LED device 220 is smaller than that of the second reflection region 242b opposite to the light-emitting energy of the second LED device 230. Namely, the brighter first LED device 220 receives less reflected light intensity, and the darker second LED device 230 receives more reflected light intensity, so that the brightness difference between the first LED device 220 and the second LED device 230 is reduced and the luminance uniformity of the backlight module 200b is improved.

In short, in the present embodiment, the first reflective material layer 246a and the second reflective material layer 246b of different reflectivity are respectively coated within the first reflection region 242a and the second reflection region 242b corresponding to the first LED device 220 and the second LED device 230 of different brightness, so as to reduce the brightness difference between the first LED device 220 and the second LED device 230 and improve the luminance uniformity of the backlight module 200b.

Figure 4:
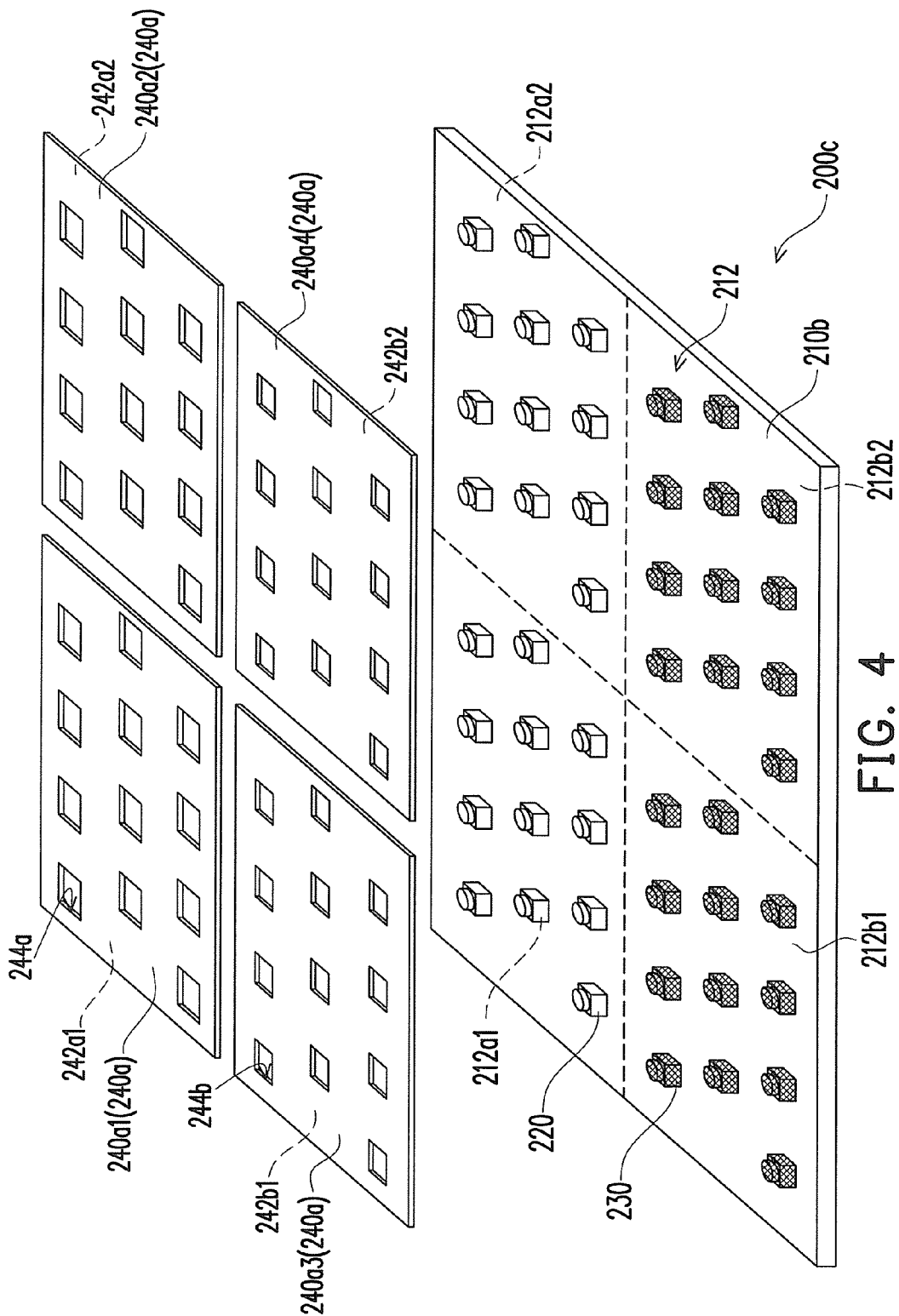
FIG. 4 is an explosion diagram of a backlight module according to yet another embodiment of the present invention.

FIG. 4 is an explosion diagram of a backlight module according to another embodiment of the present invention. Referring to both FIG. 2B and FIG. 4, the backlight module 200c in the present embodiment illustrated in FIG. 4 is similar to the backlight module 200a illustrated in FIG. 2B, and the major difference between the two is that in the backlight module 200c illustrated in FIG. 4, the circuit board 210b has two first carrying regions 212a1 and 212a2 and two second carrying regions 212b1 and 212b2, and the reflection device 240a is composed of a plurality of reflective sheets 240a1~240a4.

To be specific, in the present embodiment, the first LED device 220 is located on the first carrying regions 212a1 and 212a2, the first reflection regions 242a1 and 242a2 of the reflective sheets 240a1 and 240a2 are respectively disposed corresponding to the first carrying regions 212a1 and 212a2, and the second LED device 230 is located on the second carrying regions 212b1 and 212b2, and the second reflection regions 242b1 and 242b2 of the reflective sheets 240a3 and 240a4 are respectively disposed corresponding to the second carrying regions 212b1 and 212b2. Even though the first LED device 220 and the second LED device 230 are respectively located on the first carrying regions 212a1 and 212a2 and the second carrying regions 212b1 and 212b2, since the first openings 244a of the reflective sheets 240a1 and 240a2 that have the greater surface area are corresponding to the first LED device 220 and the second openings 244b of the reflective sheets 240a3 and 240a4 that have the smaller surface area are corresponding to the second LED device 230, when the first LED device 220 and the second LED device 230 emit lights, the brighter first LED device 220 within the first carrying regions 212a1 and 212a2 receives less reflected light intensity, and the darker second LED device 230 within the second carrying regions 212b1 and 212b2 receives more reflected light intensity. Namely, the brightness difference between the first LED device 220 within the first carrying regions 212a1 and 212a2 and the second LED device 230 within the second carrying regions 212b1 and 212b2 is reduced, and the luminance uniformity of the backlight module 200c is improved.

In short, in the present embodiment, the first LED device 220 with higher brightness has to be disposed along with the reflective sheets 240a1 and 240a2 that have the larger first openings 244a, and the second LED device 230 with lower brightness has to be disposed along with the reflective sheets 240a3 and 240a4 that have the smaller second openings 244b, such that the brightness difference between the first LED device 220 and the second LED device 230 can be reduced and the luminance uniformity of the backlight module 200c can be improved.

It should be mentioned that the numbers of the first carrying regions 212a1 and 212a2 and the second carrying regions 212b1 and 212b2 on the circuit board 210b are only examples but not intended for limiting the present invention, and which can be respectively increased or decreased according to the actual requirement. Besides, in other embodiments, the circuit board 200b may also include a third carrying region for carrying a LED device having different brightness from that of the first and the second LED devices, which still belongs to means of the present invention and does not depart from the scope of the present invention.

Figure 5:
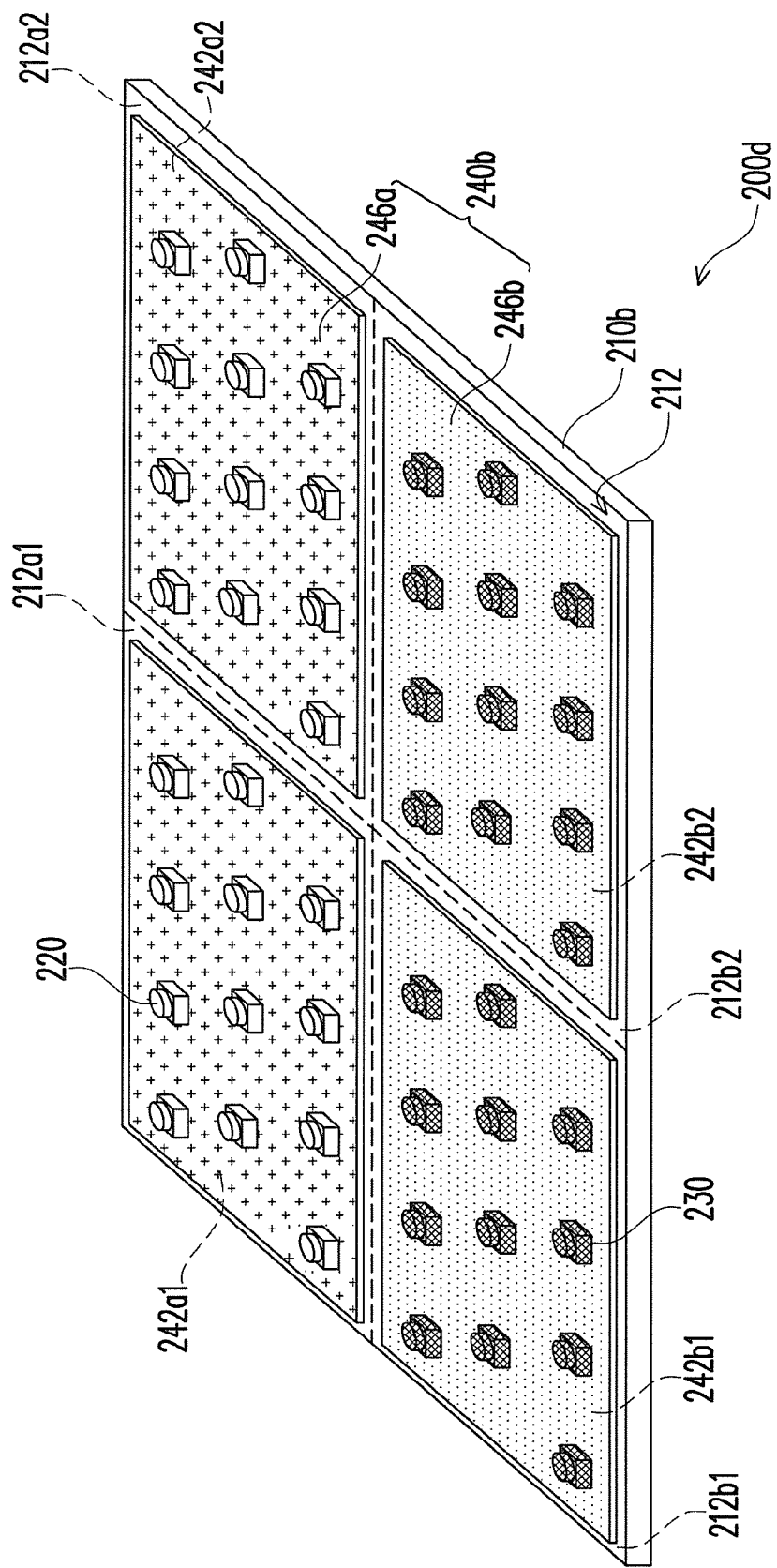
FIG. 5 is a diagram of a backlight module according to still another embodiment of the present invention.

FIG. 5 is a diagram of a backlight module according to yet another embodiment of the present invention. Referring to both FIG. 4 and FIG. 5, the backlight module 200d in the present embodiment illustrated in FIG. 5 is similar to the backlight module 200c illustrated in FIG. 4, and the major difference between the two is that in the backlight module 200d illustrated in FIG. 5, the first reflection regions 242a1 and 242a2 of the reflection device 240b are formed by coating a first reflective material layer 246a, the second reflection regions 242b1 and 246b2 of the reflection device 240b are formed by coating a second reflective material layer 246b, and the reflectivity of the first reflective material layer 246a is smaller than that of the second reflective material layer 246b.

To be specific, in the present embodiment, because the first reflection regions 242a1 and 242a2 are disposed around the first LED device 220, the second reflection regions 242b1 and 242b2 are disposed around the second LED device 230, and the reflectivity of the first reflective material layer 246a is smaller than that of the second reflective material layer 246b, when the first LED device 220 and the second LED device 230 emit lights, the brighter first LED device 220 receives less reflected light intensity while the darker second LED device 230 receives more reflected light intensity, so that the brightness difference between the first LED device 220 within the first carrying regions 212a1 and 212a2 and the second LED device 230 within the second carrying regions 212b1 and 212b2 is reduced, and the luminance uniformity of the entire backlight module 200d is improved.

In short, in the present embodiment, the first reflective material layer 246a and the second reflective material layer 246b of different reflectivity are respectively coated within the first reflection regions 242a1 and 242a2 and the second reflection regions 242b1 and 242b2 along with the first LED device 220 and the second LED device 230 of different brightness, such that the brightness difference between the first LED device 220 within the first carrying regions 212a1 and 212a2 and the second LED device 230 within the second carrying region 212b1 and 212b2 is reduced, and the luminance uniformity of the backlight module 200d is improved.

As described above, in the present invention, the LED devices having different brightness and are disposed corresponding to a reflective sheet having openings of different sizes or reflective material layers having different reflectivity, so that the brighter first LED devices receive less reflected light intensity while the darker second LED device receive more reflected light intensity. Accordingly, the brightness difference between the LED devices is reduced, the luminance uniformity of the backlight module is improved, and the display quality of a display device using the backlight module is also improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A backlight module, comprising:
a circuit board, having a carrying surface;
at least one first light emitting diode (LED) device, disposed on the carrying surface of the circuit board and electrically connected to the circuit board;
at least one second LED device, disposed on the carrying surface of the circuit board and electrically connected to the circuit board, wherein a brightness of the first LED device is greater than a brightness of the second LED device; and
a reflection device, disposed on the circuit board, and exposing the first LED device and the second LED device, the reflection device having at least one first reflection region and at least one second reflection region, wherein the first reflection region is disposed around the first LED device, the second reflection region is disposed around the second LED device, and a reflection ratio of the first reflection region opposite to a light-emitting energy of the first LED device is smaller than a reflection ratio of the second reflection region opposite to a light-emitting energy of the second LED device, wherein the reflection device is a reflective sheet, the reflective sheet has at least one first opening and at least one second opening, the first opening exposes the first LED device, the second opening exposes the second LED device, and a surface area of the first opening is greater than a surface area of the second opening.

2. The backlight module according to claim 1, wherein a shape of the first opening comprises a rectangular shape or a circular shape.

3. The backlight module according to claim 1, wherein a shape of the second opening comprises a rectangular shape or a circular shape.

4. The backlight module according to claim 1, wherein the first reflection region of the reflection device is formed by coating a first reflective material layer, the second reflection region of the reflection device is formed by coating a second reflective material layer, and a reflectivity of the first reflective material layer is smaller than a reflectivity of the second reflective material layer.

5. A display device, comprising:
a display panel;
a backlight module, disposed at one side of the display panel, comprising:
a circuit board, having a carrying surface;
at least one first LED device, disposed on the carrying surface of the circuit board and electrically connected to the circuit board;
at least one second LED device, disposed on the carrying surface of the circuit board and electrically connected to the circuit board, wherein a brightness of the first LED device is greater than a brightness of the second LED device; and
a reflection device, disposed on the circuit board, and exposing the first LED device and the second LED device, the reflection device having at least one first reflection region and at least one second reflection region, wherein the first reflection region is disposed around the first LED device, the second reflection region is disposed around the second LED device, and a reflection ratio of the first reflection region opposite to a light-emitting energy of the first LED device is smaller than a reflection ratio of the second reflection region opposite to a light-emitting energy of the second LED device, wherein the reflection device is a reflective sheet, the reflective sheet has at least one first opening and at least one second opening, the first opening exposes the first LED device, the second opening exposes the second LED device, and a surface area of the first opening is greater than a surface area of the second opening.

6. The display device according to claim 5, wherein a shape of the first opening comprises a rectangular shape or a circular shape.

7. The display device according to claim 5, wherein a shape of the second opening comprises a rectangular shape or a circular shape.

8. The display device according to claim 5, wherein the first reflection region of the reflection device is formed by coating a first reflective material layer, the second reflection region of the reflection device is formed by coating a second reflective material layer, and a reflectivity of the first reflective material layer is smaller than a reflectivity of the second reflective material layer.

* * * * *